July 4, 1933.    H. A. RIKE    1,916,490
VALVE
Filed June 27, 1931    2 Sheets-Sheet 1

Inventor
H. A. Rike
By Wilkinson & Mawhinney
Attorneys.

July 4, 1933.                    H. A. RIKE                    1,916,490
                                   VALVE
                        Filed June 27, 1931           2 Sheets-Sheet 2
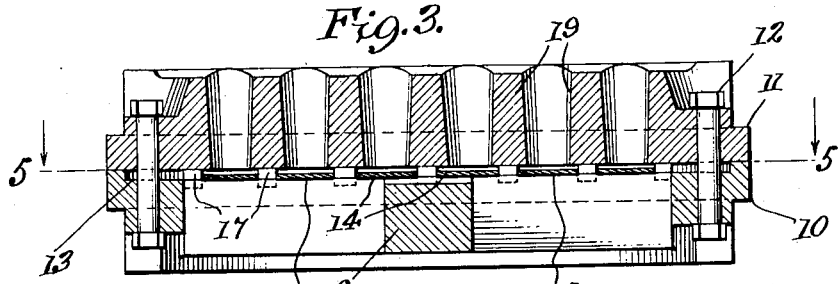
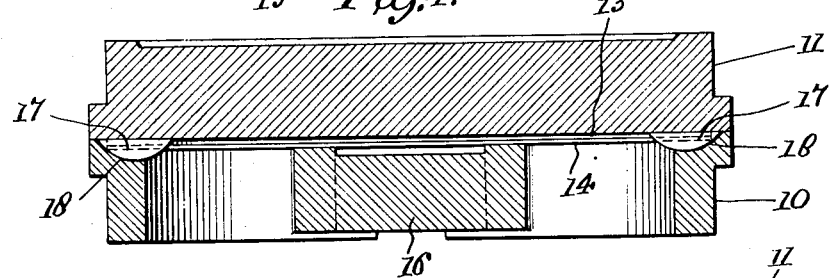
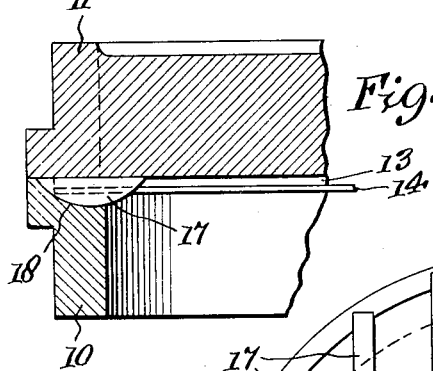
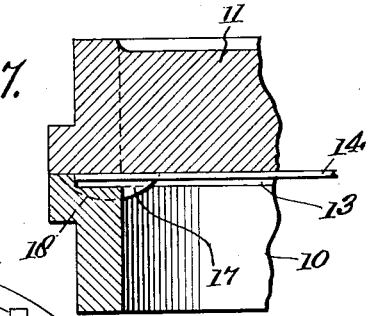
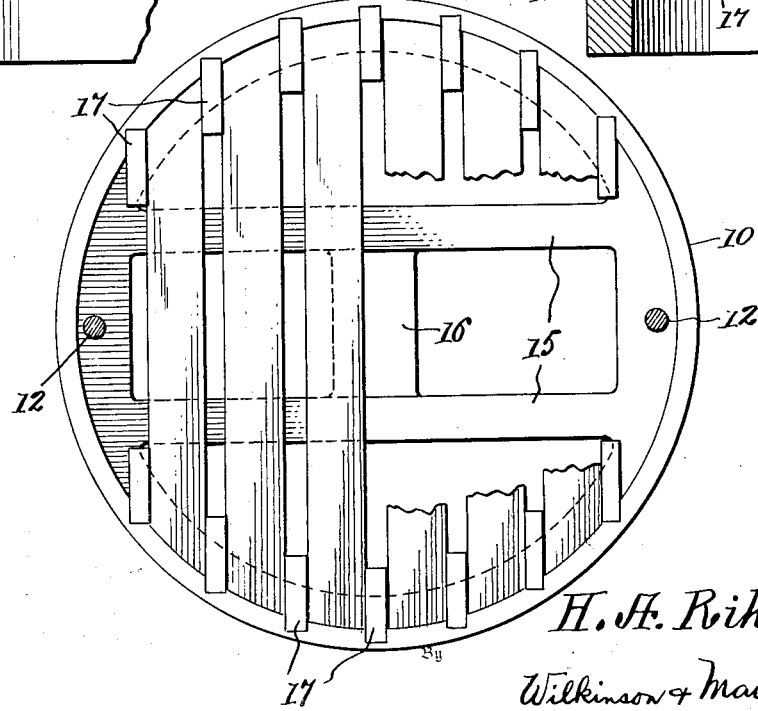
Inventor
H. A. Rike
By Wilkinson & Mawhinney
Attorneys.

Patented July 4, 1933

1,916,490

UNITED STATES PATENT OFFICE

HOWARD A. RIKE, OF NORPHLET, ARKANSAS

VALVE

Application filed June 27, 1931. Serial No. 547,361.

The present invention relates to valves, adapted particularly for use in connection with compressors, Diesel engines, pumps and other machines with which is maintained a pulsating high pressure line.

An object of the present invention is to provide a valve of the free floating strip type which is operable without any spring or flexing action and which is sensitive and quick acting in opening and closing by slight differential pressures in the line at opposite sides of the valve.

In the construction of valves of this type, a plurality of plates or strips are employed which are of a flexible expansive character and which, under pressure, are bowed or sprung away from their respective seats with the result that there is considerable wear, friction and generation of heat at the opposite ends of the strips, resulting in the undue wear of the body and guard plate of the valve and frequent breakage of the ends of the strips. These flexible strips require very frequent replacement not only of the strips themselves, but also of the entire valve body, a time consuming and costly operation.

To reduce the very great cost of construction and maintenance of this type of valve, inelastic strips or plates have been used, but with the addition of springs biased to close the strips with the result that a large percentage of pressure is required initially to open the valve against the spring pressure, and the springs quickly become fouled and unequal in pressure and soon become totally inoperative.

It is the purpose of the present invention to provide an improved structure wherein may be used non-resilient cheaply constructed flat strips or blades, and wherein the blades may freely move bodily without spring pressure and without bending toward and from their respective valve seats under the influence of the differential pressures at opposite sides of the valve.

Another object of the present invention is to provide improved means for separating the strips at their opposite ends and holding them in true alignment with their respective seats, this means also serving as wearing surfaces adapted to take the wear between the strips and the valve so that the means may be renewed from time to time and thus save the expense of providing new valves or valve parts.

The invention also aims at the provision of a feather compressor valve embodying the above characteristics and which maintains the general configuration and structure of valves of this type so that they may be readily substituted therefor and be manufactured with the desired capacity for the pressure medium without any appreciable change in the dimensions of the ports and other parts of the valve.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a perspective view of a valve constructed according to the present invention and showing the guard and seat separated and showing the strips or plates in position in the guard.

Figure 3 is a transverse section taken through the valve substantially on the line 3—3 of Figure 2, and with the strips or plates in open position.

Figure 4 is a similar view but taken axially at right angles on the line 4—4 of Figure 2.

Figure 5 is a horizontal section taken on the line 5—5 of Figure 3 between the guard and the seat, several of the strips or plates being broken away to show the supporting cross bar structure.

Figure 6 is a fragmentary enlarged sectional view taken through one side of the valve, showing the mounting of one of the wear keys in the guard in relation to the adjacent end of one of the valve strips, the latter being in open position, and Figure 7 is a similar view showing the valve strips in closed position.

Figure 1:
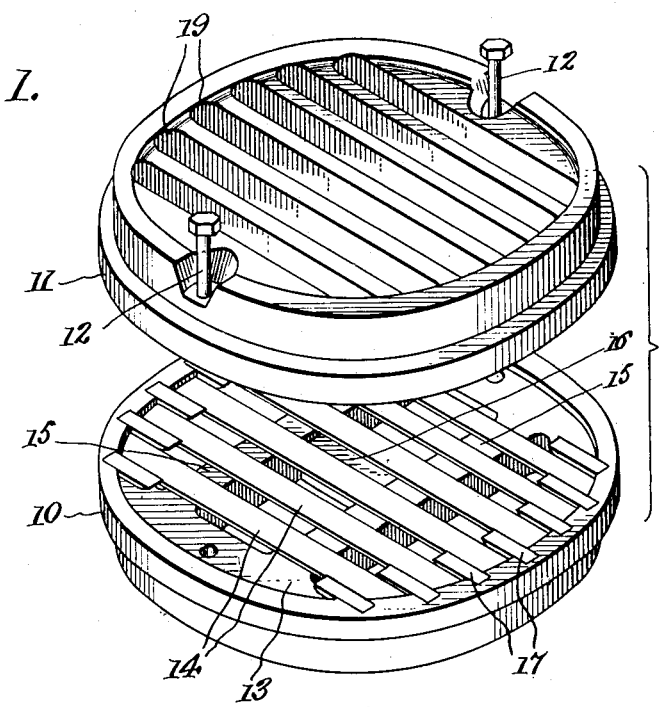
Figure 2:
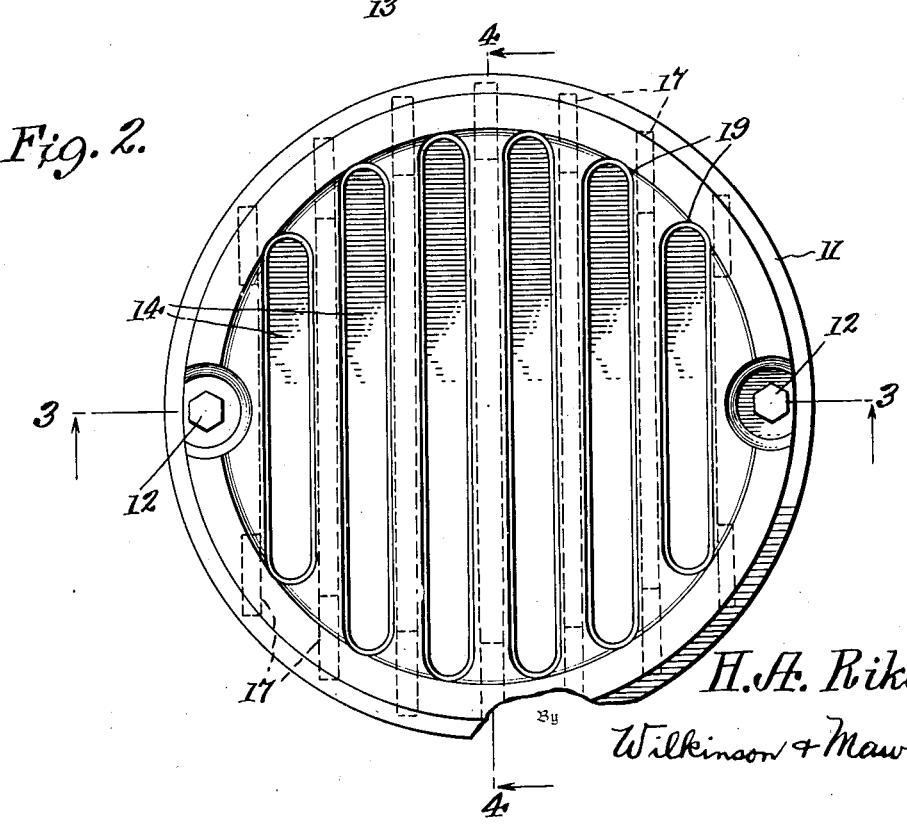
Figure 2 is a top plan view of the improved valve.

Referring now to the drawings, the valve comprises a guard 10 and a seat 11 which are in the present instance shown as of circular construction and which are adapted to be fitted together in face to face contact and secured in such relation in any suitable manner such as by bolts 12 with their accompanying nuts.

The guard 10 is of substantially ring shape and is provided with an inner marginal annular ledge or surface 13 providing shoulders or supports for the opposite ends of the strips or plates 14, which are disposed in substantially parallel spaced apart relation across the annular frame of the guard 10, as shown in Figure 5 particularly.

Each strip or plate 14 may be constructed inexpensively from relatively cheap material, is preferably inelastic, and the strips 14 may be suitably cut and shaped from rolls of strip material or from any other suitable source. For the purpose of adequately supporting the intermediate portions of the strips 14 across the annular frame and at the same time exposing a sufficient surface area of the strips through the frame 10 of the guard, the guard is provided with preferably a pair of spaced apart supporting bars 15 which may be formed integrally with the guard or otherwise suitably mounted therein, and with their upper bearing faces lying in substantially the same plane with the annular ledge or shoulder 13 of the ring frame of the guard.

The bars 15 are suitably spaced apart so as to give the desired support to the strips 14 at spaced points between the supported ends of the strips to hold the latter from bending or buckling under various pressures tending to move into and hold the strips in open position. If desired, the supporting bars 15 may be provided with a web 16 or the like which joins the bars at the intermediate portions, and the bars and the web may be of any suitable thickness or width desired to afford the necessary support and to strengthen the entire valve structure.

The strips or plates 14 are held apart in edgewise relation from one another by wear keys 17 which, as best shown in Figure 6, are provided with flat upper faces adapted for contact with the inner or lower face of the seat 11 of the valve, and which at their lower sides are provided with curved or rounded surfaces adapted to seat in correspondingly formed recesses 18 provided in the ledge or shoulder 13 and which may extend into the outer rim portion of the guard frame 10, as shown in Figure 5. These wear keys thus constitute spacing members and have ground seating upper faces adapted to be sealed against the inner face of the seat 11 when the valve parts are assembled, as shown in Figure 6.

The valve seat 11 is adapted to engage the keys 17 and hold the same in their respective recesses 18 and the shoulder or ledge 13 is countersunk with respect to the outer face of the guard 10 a distance greater than the thickness of the valve strips 14 so as to provide ample space for the bodily movement of the strip 14 between the guard 10 and the seat 11.

The valve seat 11 is also of circular or annular construction so as to conform to the exterior contour of the guard 10 and is provided with a plurality of spaced apart parallel seat bars 19 which may be made integrally with the annular frame of the seat 11 or otherwise mounted therein and which are disposed in overlapping relation with respect to the edge portions of adjacent strips and against which said edge portions of the strips are adapted to seat when the strips 15 are raised or moved toward the seat bars 19. The ports in the valve are thus defined between the seat bars 19 and the strips 14 are arranged in register with these ports so that when the strips are moved against the inner faces of the seat bars 19, the strips are sealed against the inner ends of the ports.

The strips 14 are thus mounted at opposite ends in seats provided between adjacent key 17 and are free to move toward and from the adjacent portion of the shoulder or ledge 13 so that there is no frictional wear or contact between the shoulder 13 and the ends of the strips 14.

The keys 17 are preferably made of hardened steel or other suitable wear resisting material so as to resist the wear incident to the frictional contact of the lateral edges of the strips 14 as the latter vibrate and thus relieves the body portion of the guard 10 from this wear so as to preserve the guard 10 indefinitely. The keys 17 themselves may be readily replaced when worn, but incident to the hardened material of which they are made, they too may be used for a relatively long period. Of course, if desired, the keys may be made of a softer material so as to distribute the wear between the strips 14 and the keys 17 as both of these may be economically and quickly replaced. In all events, the wear upon the body portion of the guard 10 is practically eliminated.

It will also be noted that as the strips 14 are relieved from all spring pressure or flexure, they are subjected to but comparatively little wear and last for a relatively long time in use and as the frame of the guard 10 is so constructed as to expose the inner or lower sides of the strips 14 for a considerable portion of their surface area, these strips 14 are susceptible to a highly sensitive and quick action under even slight differences in pressure at opposite sides of the valve.

From the above, it is thought the operation will be clearly understood, because when there is a differential pressure in the valve with a higher pressure on the guard side, such as pressure under suction, the valve strips 14 will be drawn bodily from end to end and uniformly from the seat bars 19 and will be supported at opposite ends on the shoulder 13 and at their intermediate portions across the bars 15. The valve is now open. Upon a change or reversal in pressures at opposite sides of the valve, the valve strips 14 are lifted bodily and uniformly from end to end from the shoulder 13, and the bars 15, and are seated in overlapping engagement at their opposite edge portions against the inner faces of the said bars 19 sealing the ports through the valve. This action is highly sensitive and is uniform throughout the lengths of the strips incident to the peculiar construction of the guard 10. The guard 10 is of relatively large open work construction so as to provide surface spaces at the inner sides of the strips 14 not only near their opposite ends but also across the intermediate portions and between the bars 15. The bars 15 thus equalize the support of the strips 14 when they are open and also afford a proper distribution of the exposed inner or lower surfaces of the strips.

It is apparent that there is no flexing of the strips 14 and it is also apparent that these strips are not subjected to any resilient or spring action of any kind so that they are highly sensitive as to their action in opening and closing, and as the shoulder 13 and the supporting bars 15 expose such a relatively large area of the inner sides of the strips 14, any slight tendency for the strips 14 to stick upon the shoulder 13 or the bars 15 is instantly overcome by the relatively great pressure against the inner exposed surfaces.

It will be obvious that various changes in the construction, combination and arrangement of parts could be made, which could be used without departing from the spirit of my invention, and I do not mean to limit the invention to such details, except as particularly pointed out in the claim.

Having thus described my invention, what I claim and desire to secure by Letters Patent of the United States is:—

In a valve, a slotted valve seat, a valve guard having a countersunk open framework extending crosswise therein and secured against the inner face of the seat, said valve guard having at its inner face an inner marginal annular ledge and also having oppositely registering recesses spaced apart in said ledge and having rounded bottom walls, flat inelastic valve strips disposed on said ledge between the recesses and at an angle across the framework for bodily movement toward and from the valve seat, and wear keys seated in said recesses and having outer flat faces for engagement against the inner face of the valve seat and having rounded inner faces for seating engagement in the recesses for aligning said keys with said valve seat and strips when said seat and valve guard are brought together.

HOWARD A. RIKE.